US011217118B1

(12) United States Patent  (10) Patent No.: US 11,217,118 B1
Smith  (45) Date of Patent: Jan. 4, 2022

(54) PERIODIC TABLE FOR THE VISUALLY IMPAIRED

(71) Applicant: Faustina L. Smith, Savannah, GA (US)

(72) Inventor: Faustina L. Smith, Savannah, GA (US)

(*) Notice: Subject to any disclaimer, the term of this patent is extended or adjusted under 35 U.S.C. 154(b) by 465 days.

(21) Appl. No.: 16/013,537

(22) Filed: Jun. 20, 2018

Related U.S. Application Data

(60) Provisional application No. 62/547,390, filed on Aug. 18, 2017.

(51) Int. Cl.
*G09B 21/00* (2006.01)
*G09B 23/24* (2006.01)

(52) U.S. Cl.
CPC ........... *G09B 21/004* (2013.01); *G09B 23/24* (2013.01)

(58) Field of Classification Search
CPC ............................... G09B 21/00; G09B 23/24
See application file for complete search history.

(56) References Cited

U.S. PATENT DOCUMENTS

| 2,891,322 | A | | 6/1959 | Brownlee | |
|---|---|---|---|---|---|
| 3,581,409 | A | * | 6/1971 | Alexander | G09B 23/24 434/282 |
| 3,594,923 | A | | 7/1971 | Midgley | |
| 5,866,832 | A | * | 2/1999 | Solowiow | G09B 15/006 84/485 R |
| 5,945,630 | A | | 8/1999 | Lovell | |
| 5,997,305 | A | * | 12/1999 | Mangles | G09B 19/02 434/188 |
| 6,539,653 | B1 | * | 4/2003 | Finke | G09B 29/04 40/124.06 |
| 7,938,646 | B2 | * | 5/2011 | Aldersley | G09B 23/24 434/282 |
| 2004/0157196 | A1 | * | 8/2004 | Wolf | G09B 19/02 434/190 |
| 2009/0004639 | A1 | * | 1/2009 | Stout | G09B 19/00 434/365 |
| 2011/0015929 | A1 | | 1/2011 | Fantin et al. | |
| 2013/0296007 | A1 | | 11/2013 | Hanson | |

OTHER PUBLICATIONS

Elements and the Periodic Table—Mayfield City Schools [online], Oct. 20, 2014 [retrieved Jun. 17, 2021], Retrieved from https://www.mayfieldschools.org/Downloads/HPS%20per%20table%20with%20spdf%20ions%20and%20families%20to%20post.pdf (Year: 2014).*
Pick Any Periodic Table of Elements Cookie Cutter Cutter part 1. Product listing [online]. © 2018 Etsy, Inc. retrieved on Oct. 19, 2016]. Retrieved from the Internet: <URL: https://www.etsy.com/listing/225371446/pick-any-periodic-table-of-elements>.

(Continued)

*Primary Examiner* — Eddy Saint-Vil
(74) *Attorney, Agent, or Firm* — Cramer Patent & Design, PLLC; Aaron R. Cramer

(57) ABSTRACT

This periodic table of elements provides tactile features particularly suited for a visually impaired user. The table provides raised element field borders and raised alphanumeric characters which correspond to a standard periodic table. The element fields are arranged in a perpendicular grid upon a semi-rigid substrate. At least one (1) linear fold line enables isolation of a portion of the chart allowing a user to focus upon a desired "energy section", "group", or "family" of elements contained within the chart.

8 Claims, 5 Drawing Sheets

(56) References Cited

OTHER PUBLICATIONS

Braille Periodic Table. Product listing [online]. © 2018 MakerBot Industries, LLC, [retrieved on Oct. 19, 2016]. Retrieved from the Internet: <URL: https://www.thingiverse.com/thing:59275>.
Happy Mole Day!!!. Article post [online]. Pieces by Pollly [published on Oct. 23, 2010]. Retrieved from the Internet: <URL:http://www.piecesbypolly.com/2010/10/happy-mole-day.html>.

* cited by examiner

PERIODIC TABLE FOR THE VISUALLY IMPAIRED

RELATED APPLICATIONS

The present invention was first described in and claims the benefit of U.S. Provisional Patent Application No. 62/547,390 filed on Aug. 18, 2017, the entire disclosures of which are incorporated herein by reference.

FIELD OF THE INVENTION

The present invention relates generally to the field of a tactile instructional tool.

BACKGROUND OF THE INVENTION

It can be a challenge to provide learning instruction to individuals with any type of visual deficiencies, especially when the lessons being taught utilize charts and other visual devices that others can grasp easily due to being able to see them. Students who have such deficiencies, whether they are minor, or major, including partial or total blindness, are at a serious disadvantage.

It is quite common for such instances to be frustrating for the instructor and the student due to the lack of resources available. Such a lesson that the present invention seeks a remedy for is teaching moderate- and higher-level chemistry subjects that entail the use of the common Periodic Table of elements.

Individuals with the aforementioned maladies commonly utilize other senses to interact and communicate with the world around them. The sense of touch is frequently used by these individuals and can be utilized for promoting an understanding of valence electrons, nuclear composition, and ionic charges, among other levels of understanding associated with the Periodic Table of elements. It is also a benefit to have such a tactile instructional tool to be able to be stored quickly and compactly.

To achieve the above and other objectives, the present invention provides for such an educational tool to be configured as a periodic table of the elements.

In certain embodiments, the tool includes a rigid substrate, having a first side and a second side separated by a primary fold line, a plurality of element fields surrounded by field borders, affixed to the substrate and arranged in a grid pattern thereupon, and a plurality of characters associated with a standard periodic table, having at least a portion affixed to the rigid substrate. The field borders and plurality of characters each are configured to provide a tactile feedback to a user, relative to the plurality of element fields. The rigid substrate further includes a plurality of secondary fold lines.

In other embodiments, the tool includes a rigid substrate, having a first side and a second side separated by a primary fold line, a plurality of element fields surrounded by field borders, affixed to the substrate and arranged in a grid pattern thereupon, and a plurality of characters associated with a standard periodic table, having at least a portion affixed to the rigid substrate. A first rod having a first pair of hanging elements on distal ends thereof is affixed to an edge of the first side and a second rod having a second pair of hanging elements on distal ends thereof is affixed to an edge of the second side opposite said first side. The field borders and plurality of characters each are configured to provide a tactile feedback to a user, relative to the plurality of element fields. The rigid substrate further includes a plurality of secondary fold lines. The first and second pair of hanging elements are capable of suspending said educational tool from a support structure.

In still other embodiments, the tool includes a rigid substrate, having a first side and a second side separated by a primary fold line, an insert capable of being placed within the rigid substrate; a plurality of element fields surrounded by field borders, affixed to the substrate and insert and arranged in a grid pattern thereupon, and a plurality of characters associated with a standard periodic table, having at least a portion affixed to the rigid substrate and insert. The field borders and plurality of characters each are configured to provide a tactile feedback to a user, relative to the plurality of element fields. The rigid substrate further includes a plurality of secondary fold lines.

In other embodiments, the tool includes a rigid substrate, having a first side and a second side separated by a primary fold line, an insert capable of being placed within the rigid substrate, a plurality of element fields surrounded by field borders, affixed to the substrate and insert and arranged in a grid pattern thereupon, and a plurality of characters associated with a standard periodic table, having at least a portion affixed to the rigid substrate and insert. A first rod having a first pair of hanging elements on distal ends thereof is affixed to an edge of the first side and a second rod having a second pair of hanging elements on distal ends thereof is affixed to an edge of the second side opposite said first side. The field borders and plurality of characters each are configured to provide a tactile feedback to a user, relative to the plurality of element fields. The rigid substrate further includes a plurality of secondary fold lines. The first and second pair of hanging elements are capable of suspending said educational tool from a support structure.

An aspect of the present invention is to provide that the plurality of element fields and plurality of characters depict a periodic table including the Groups 1A through 8A elements and Groups 1B through 8B elements. The plurality of secondary fold lines delineate between the separate energy sections.

Another aspect of the present invention is to provide where at least another portion of the plurality of characters are removably attachable to the plurality of element fields. These characters are associated with Lewis Dot structures.

Yet another aspect of the present invention is to provide where the plurality of element fields have different surface textures, and also the plurality of characters have different surface textures.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
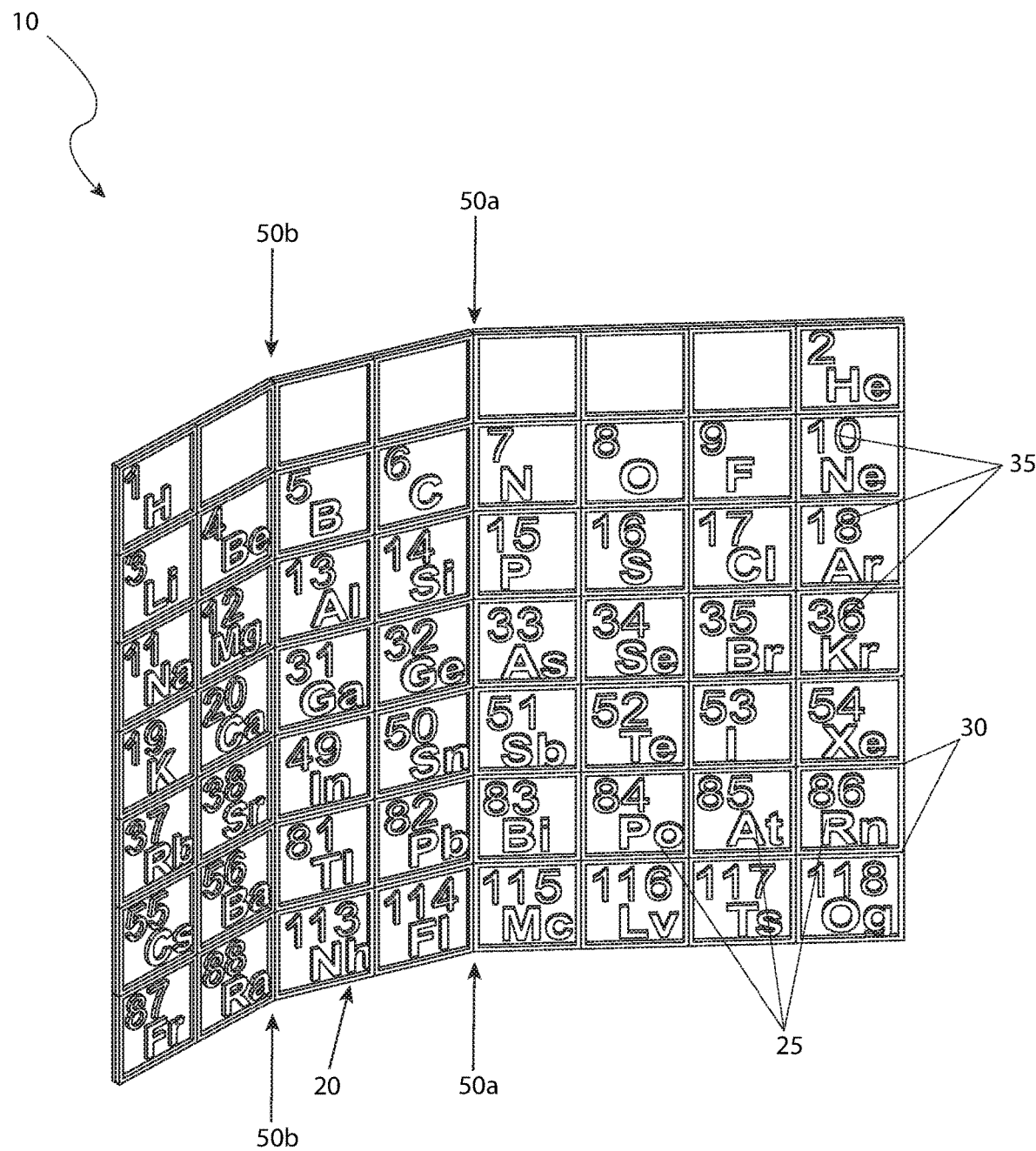
FIG. 1 is a front view of a tactile periodic table 10, according to a preferred embodiment of the present invention.

DESCRIPTIVE KEY 10 tactile periodic table
20 substrate
21 rod sleeve
22 hanging rod
23 hook feature
25 element field
30 field border
35 alphanumeric character
50a first fold line
50b second fold line
50c third fold line
50d fourth fold line
60 energy section "s"
62 energy section "p"
64 Period 7 elements
66 energy section "d"
70 electron character
100 transitional element insert
110 blank space

DETAILED DESCRIPTION OF THE PREFERRED EMBODIMENT

The best mode for carrying out the invention is presented in terms of its preferred embodiment, herein depicted within FIGS. 1 through 4. FIG. 5 depicts an alternate embodiment. However, the invention is not limited to the described embodiment, and a person skilled in the art will appreciate that many other embodiments of the invention are possible without deviating from the basic concept of the invention and that any such work around will also fall under the scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Referring now to FIG. 1, a front view of the tactile periodic table (herein described as the "device") 10, according to a preferred embodiment of the present invention, is disclosed. The device 10 provides a type of periodic table of elements (minus the Transitional elements) having features particularly suited for a visually impaired user. The device 10 provides a plurality of element fields 25 surrounded by field borders 30, and a plurality of alphanumeric characters 35 associated with a standard periodic table. Preferably, the element fields 25 are square in shape. The field border portions 30 are arranged in a perpendicular grid upon a substrate 20 (also see FIG. 2). In an exemplary embodiment, an embodiment of the device 10 is shown here depicting a periodic table including Groups 1A through 8A elements, being arranged in eight (8) columns and seven (7) rows of element fields 25. Each element field 25 is envisioned to be approximately two square inches (2 in.$^2$) in size.

The tactile portions 30, 35 of the device 10 are envisioned to include items such as, but not limited to: element symbols, atomic number digits, atomic weight digits, and the like, being arranged and permanently affixed upon a semi-rigid substrate 20 envisioned being made using a semi-rigid planar panel using extruded plastic sheet, pressed paper board, or the like. The tactile items 30, 35 provide raised features having different heights, as well as utilizing various construction materials having various surface textures to help a user to differentiate different groupings, locations, and values associated with each element in the table (also see FIG. 2).

However, it is understood that other embodiments of the device 10 may be configured with additional elemental groups, families, periods, and the like, and should not be interpreted as a limiting factor of the device 10.

Figure 2:
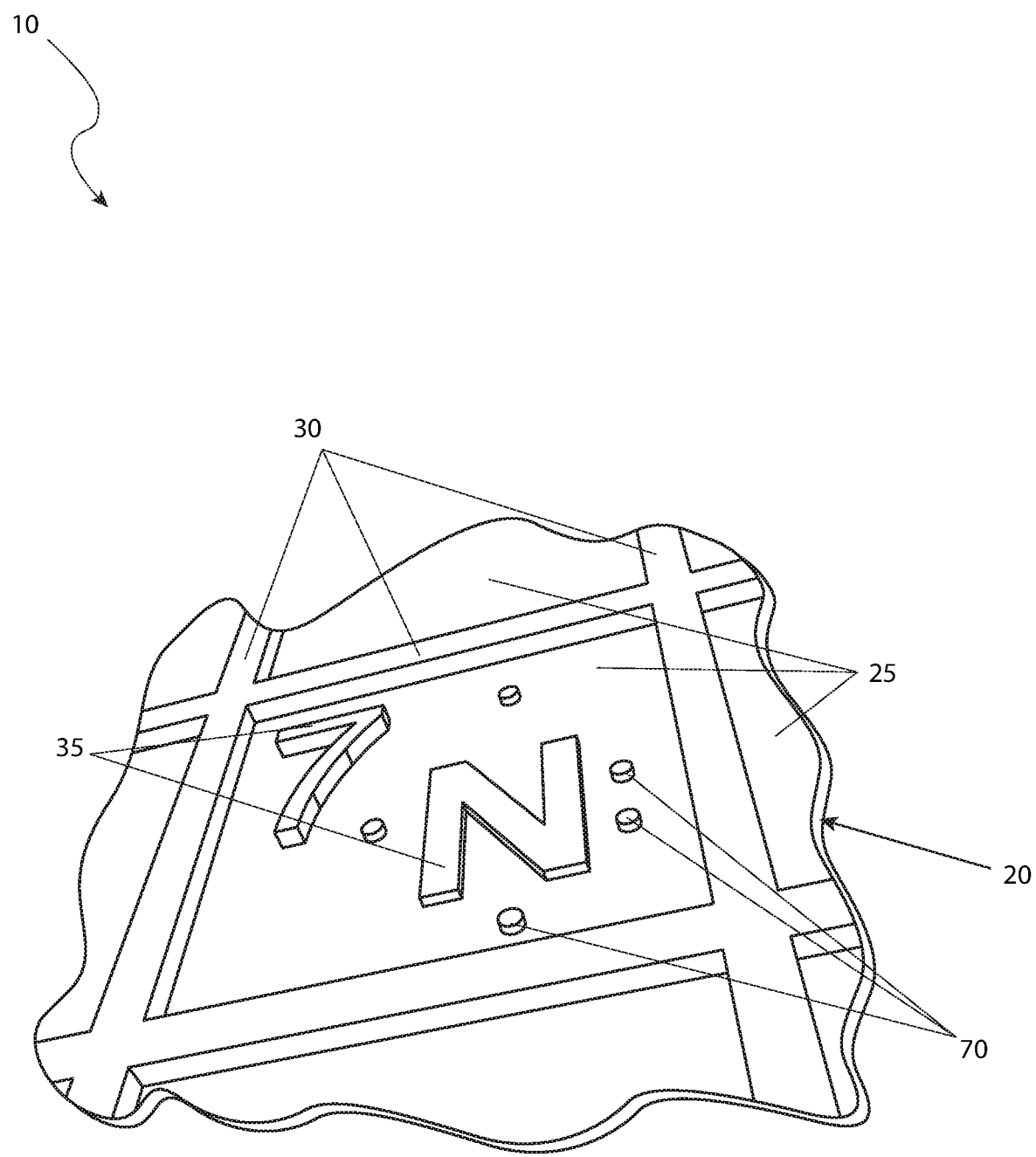
FIG. 2 is an isolated close-up view of an element field portion 25 of the tactile periodic table 10 illustrating particular tactile items 30, 35, 70, according to a preferred embodiment of the present invention.

Referring now to FIG. 2, an isolated close-up view of the device 10 illustrating particular tactile items 30, 35, 70 according to a preferred embodiment of the present invention, is disclosed. A portion of the substrate 20 is isolated here depicting, for example, an element field 25 for the element nitrogen, which provides corresponding alphanumeric characters 35 including an element symbol ("N") and an atomic number ("7"). The embodiment shown here further provides a plurality of removably attached electron characters 70 having a circular shape and are envisioned to be temporarily affixed to the surface of the substrate 20 within the element field 25 using a release-type adhesive backing material. The electron characters 70 may be removed and/or repositioned between different element fields 25 to enable teaching of Lewis Dot structures, bonding, chemical equations, and similar lessons.

The tactile items 30, 35, 70 are to utilize different construction materials such as cardboard, canvas, smooth plastic, leather, foam rubber, and the like, to provide distinguishable surface textures. In one (1) embodiment of the device 10, the rows of element fields 25 having different textures would be arranged in an alternating manner. For example, the first, third, fifth, and seventh rows would have canvas-textured alphanumeric characters 35 being affixed to the correct element fields 25, and the second, fourth, and sixth rows would have foam alphanumeric characters 35 being affixed to the correct element fields 25. The change in texture allows tactile difference between the different energy levels of the rows and element fields 25, thereby allowing the student to know quickly the energy level of each element field 25.

Figure 3:
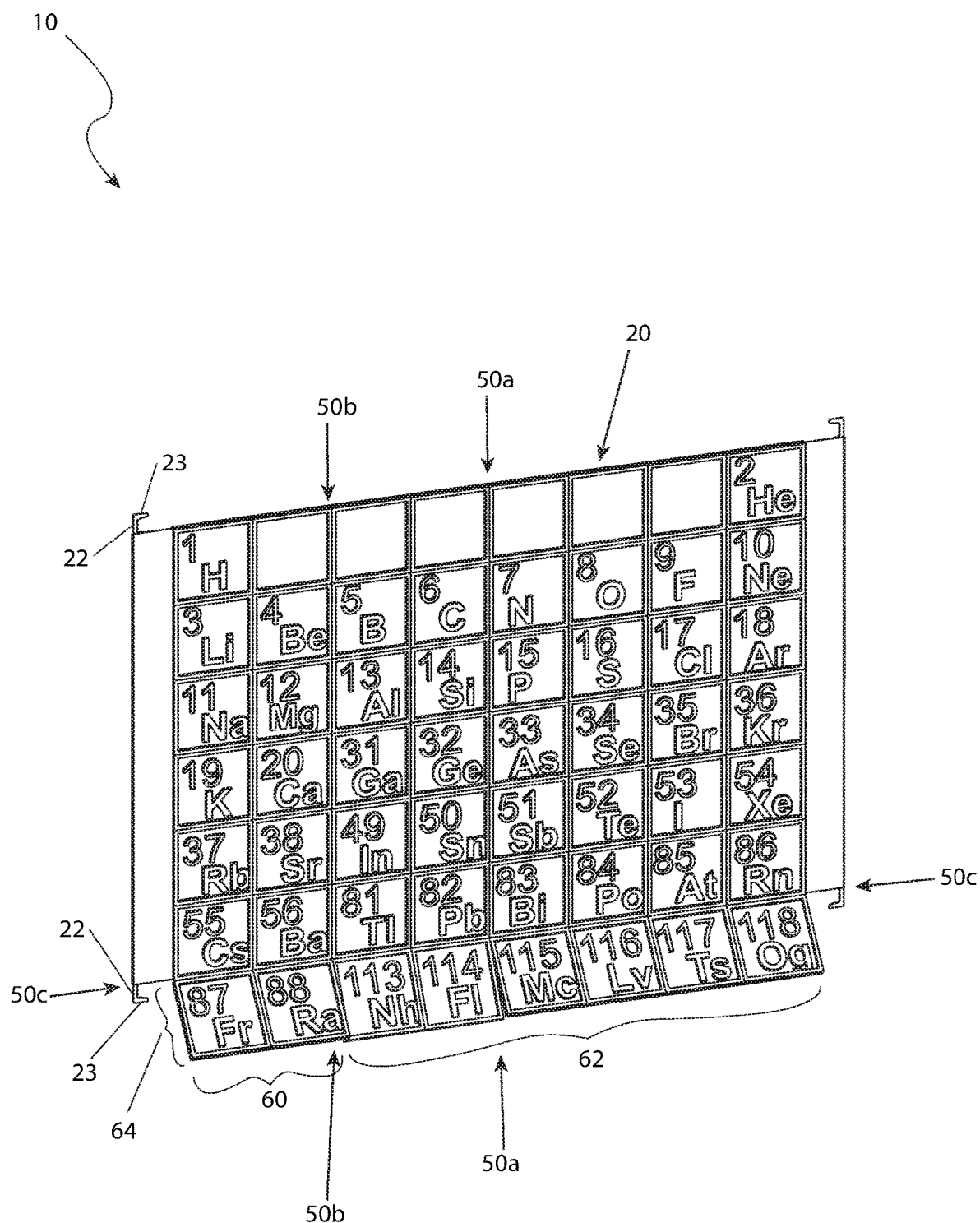
FIG. 3 is another front view of the tactile periodic table 10 depicting a pair of fold lines 50a, 50b which provide tactile linear sectioning of a substrate portion 20 of the tactile periodic table 10, according to an alternate embodiment of the present invention.

In FIG. 3, a first fold line 50a and a second fold line 50b provide tactile linear sectioning of the substrate 20. In a preferred embodiment, the first vertical fold line 50a is located between the fourth and fifth columns and the second vertical fold line 50b is located between the second and third columns. An embodiment of the device 10 is illustrated here, as an example, having a vertical first fold line 50a to allow protective closing of the device 10 and a second vertical fold line 50b between two (2) energy sections 60, 62 of the device 10. However, it is understood that the substrate 20 may be configured to include a plurality of fold lines 50a, 50b in vertical and/or horizontal orientations, as desired, to distinguish various "groups", "families", and the like, based upon a user's preferences, and as such should not be interpreted as a limiting factor of the device 10.

In the embodiment of the device 10 shown here, the second fold line 50b acts to communicate a separation of an energy section "s" 60 of the periodic table, from an energy section "p" 62 portion in a tactile manner, as the second fold line 50b is folded. During use of the illustrated embodiment of the device 10 shown here, the energy section "s" 60 (Groups 1A and 2A) may be hidden by folding the left-hand energy section "s" 60 under the six-column energy section "p" 62 side, thereby allowing a student to focus upon the energy section "p" 62 (Groups 3A through 8A). In like manner, by folding under the right-hand energy section "p" 62 side, a user may differentiate and concentrate on the energy section "s" 60 (Groups 1A and 2A).

Referring again to FIG. 3, it is further envisioned that hanging appendages 22, 23 may be affixed to corner portions of the substrate 20, if desired, which would allow the device 10 to be hung for convenience within a filing cabinet drawer in a similar manner as a conventional hanging folder. In this embodiment, the Period 7 elements 64 are folded in a forward direction via the third fold line 50c, which horizontally separates the Period 7 elements 64 from the Period 6 elements. The bottom of the first fold line 50a and second fold line 50b are split to enable the Period 7 elements 64 to be folded inward so they are protected when the first fold line 50a is folded to place the entire device 10 in a filing cabinet.

Figure 4:
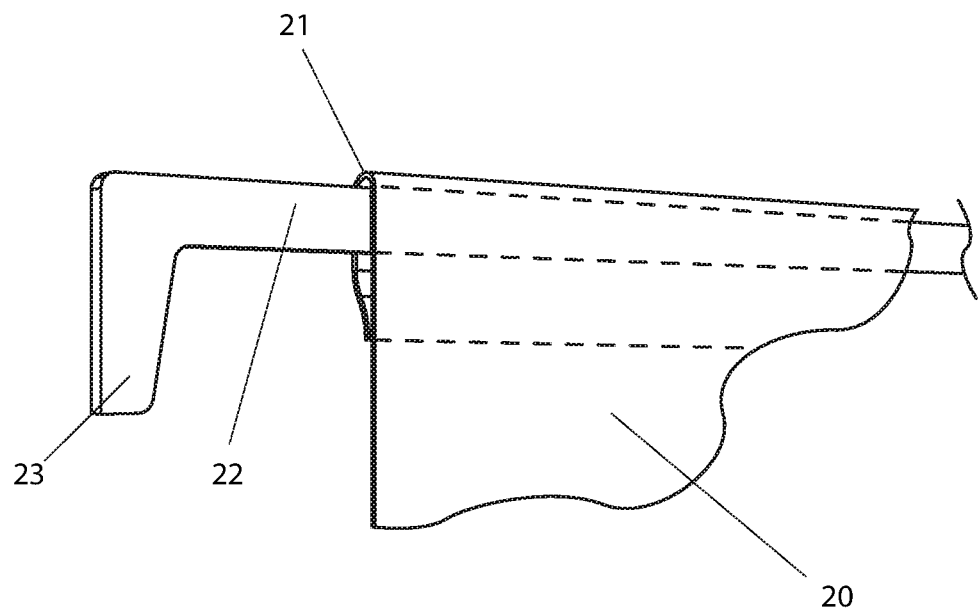
FIG. 4 is a close-up view of a hanging rod portion 22 of the substrate portion 20, according to the alternate embodiment of the present invention; and, FIG. 5 is a perspective view of the transitional element insert 110, according to an alternate embodiment of the present invention.
Figure 5:
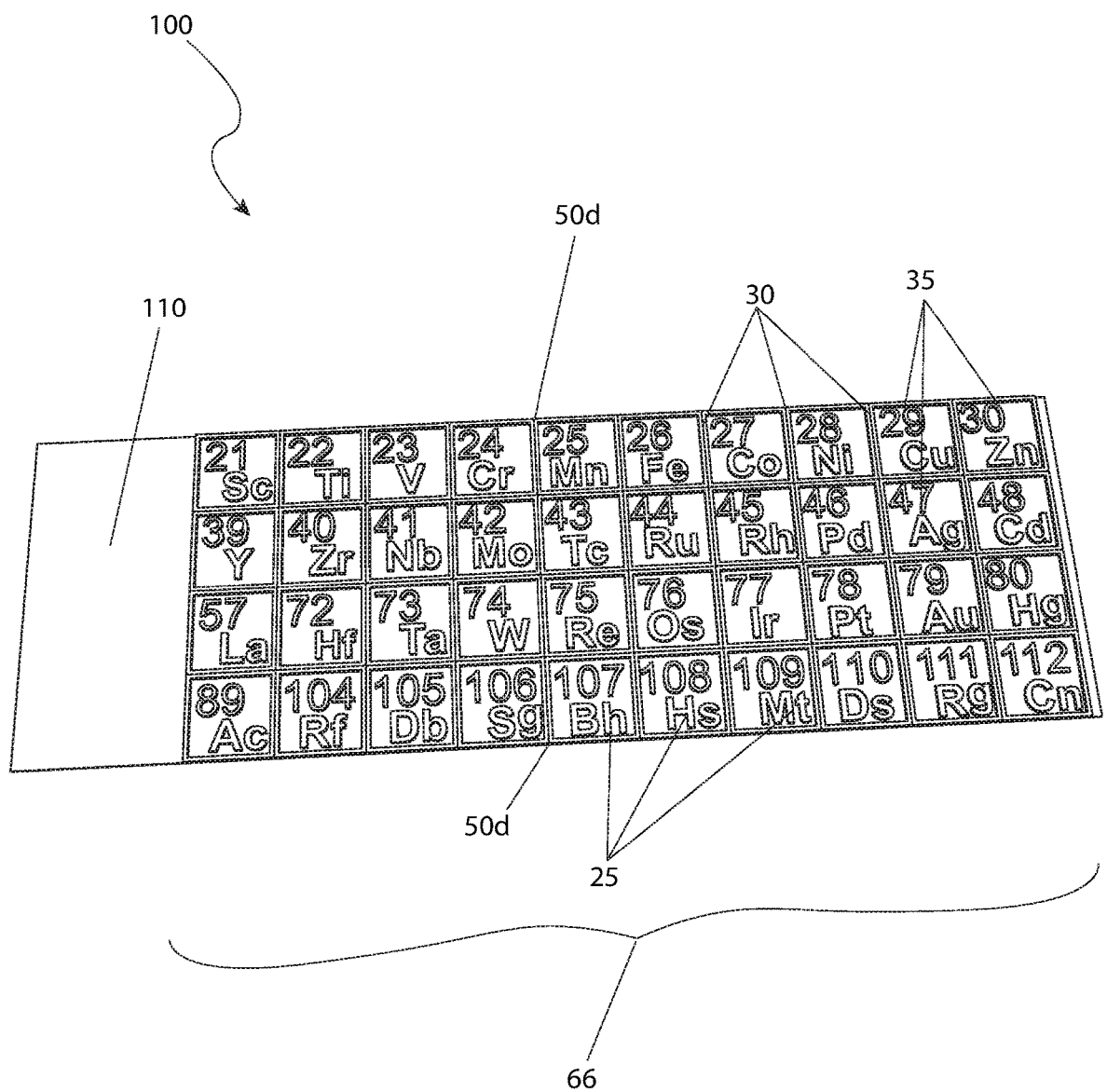

Referring now to FIG. 4, a close-up view of a hanging rod portion 22 of the substrate 20, according to a preferred embodiment of the present invention, is disclosed. The preferred embodiment of the substrate 20 includes a pair of hanging rods 22, one (1) positioned along each right-hand and left-hand edge of the device 10. The hanging rods 22 provide a convenient means of hanging the device 10 in a filing cabinet or similar storage device. Each hanging rod 22 is affixed to the substrate 20 via a "U"-shaped rod sleeve 21 which is formed into a respective right-hand and left-hand edge portion of the substrate 20. Additionally, the hanging rod 22 includes integral hook features 23 at each end portion which allow the device 10 to engage and attach to corresponding structural features of a file cabinet or similar storage device.

Referring now to FIG. 5, which is a perspective view of the transitional element insert 100 that can be used with the device 10. The transitional elements are illustrated here, and are envisioned to be utilized with the same substrate 20 and have the same general style of alphanumeric characters 35 within the element fields 25 as with the preferred embodiment, as well as the tactile field borders 30 and enablement of removable attachment of the electron characters 70. Further, the transitional element insert 100 has a blank space 110 having a width the same size as the width of two (2) columns of the element fields 25. The transitional element insert 100 further has a fourth fold line 50d located between the fourth and fifth columns. The blank space 110 exists to provide the proper placement of the transitional element insert 100 underneath the proper elements when properly inserted. This proper insertion exists when the left edge of the transitional element insert 100 abuts against the first fold line 50a and the bottom edge of the transitional element insert 100 is coextensive with the bottom edge of the device 10. Thus, when the device 10 is folded along the second fold line 50b, the left side of the periodic table aligns in proper place with the transitional element insert 100. It is envisioned that the transitional element insert 100 is utilized as an auxiliary teaching tool with or without the device 10.

It is envisioned that other styles and configurations of the present invention can be easily incorporated into the teachings of the present invention, and only one (1) particular configuration shall be shown and described for purposes of clarity and disclosure and not by way of limitation of scope. Such other styles and configurations can include an insert or inserts that incorporate the Lanthanide Group of elements and/or the Actinide Group of elements. Other styles and configurations would also provide for display of the entire known periodic table. Such an insert can utilize generally the same or identical materials, sizes, and shapes as the device 10 and transitional elements insert 100.

The preferred embodiment of the present invention can be utilized by the common user in a simple and effortless manner with little or no training. After initial purchase or acquisition of the device 10, it would be configured as indicated in FIG. 1.

The method of utilizing the device 10 may be achieved by performing the following steps: procuring a model of the device 10 which includes desired elemental groups, families, periods, and the like; familiarizing a visually impaired student with the height, shape, and surface texture of the various tactile portions 25, 30, 35, 70 until the student obtains a working knowledge of the device 10; utilizing one (1) or more fold lines 50a, 50b, 50c, as desired, to distinguish and focus on various energy sections, groups or families of elements, by folding the substrate 20 about appropriate fold lines 50a, 50b, 50c; utilizing a plurality of electron characters 70 to teach Lewis Dot structures, bonding, chemical equations, and similar lessons by placing or repositioning the electron characters 70 upon the different element fields 25; hanging the device 10 within a filing cabinet or similar storage device using the hanging rods 22 and hook features 23 until needed again; and, benefiting from an enhanced periodic table having tactile features particularly suited to a visually impaired user of the present invention 10.

An additional method would be inserting the transitional elements insert 100 into the device 10 such that the left edge abuts the first fold line 50a and the bottom edge is coextensive with the bottom edge of the device 10. This enables the device 10 to be folded along the second fold line 50b such that the left side of the periodic table is properly aligned with the transitional elements insert 100.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

The invention claimed is:

1. A planar tactile periodic table, consisting of:
   a rigid substrate having a first side and a second side separated by a primary fold line;
   a plurality of element fields surrounded by field borders, affixed to said substrate and arranged in a grid pattern thereupon;
   a plurality of characters associated with a standard periodic table, having at least a portion affixed to said rigid substrate;
   wherein said field borders and said characters each are configured to provide a tactile feedback to a user, relative to said element fields;

wherein said rigid substrate further comprises a plurality of secondary fold lines;
wherein said planar tactile periodic table is adapted to provide a plurality of periodic table of elements features for a visually impaired user;
wherein said tactile feedback includes an item selected from the group consisting of an element symbol, an atomic number digit, or an atomic weight digit;
wherein said element fields and said characters depict a periodic table including Groups 1A through 8A elements;
wherein said secondary fold lines delineate between separate energy sections;
wherein at least another portion of characters are associated with Lewis Dot structures; and
wherein said at least another portion of characters are removably attachable to said element fields.

2. The planar tactile periodic table of claim 1, wherein:
said element fields have different surface textures; and
said characters have different surface textures.

3. A planar tactile periodic table, comprising consisting of:
a rigid substrate having a first side and a second side separated by a primary fold line;
a first rod having a first pair of hanging elements on distal ends thereof, affixed to an edge of said first side;
a second rod having a second pair of hanging elements on distal ends thereof, affixed to an edge of said second side opposite said first side;
a plurality of element fields surrounded by field borders, affixed to said substrate and arranged in a grid pattern thereupon; and
a plurality of characters associated with a standard periodic table, having at least a portion affixed to said rigid substrate;
wherein said field borders and said characters each are configured to provide a tactile feedback to a user, relative to said element fields;
wherein said first pair of hanging elements and said second pair of hanging elements are capable of suspending said planar tactile periodic table from a support structure;
wherein said rigid substrate further comprises a plurality of secondary fold lines;
wherein said planar tactile periodic table is adapted to provide a plurality of periodic table of elements features for a visually impaired user;
wherein said tactile feedback includes an item selected from the group consisting of an element symbol, an atomic number digit, or an atomic weight digit;
wherein said element fields and said characters depict a periodic table including Groups 1A through 8A elements;
wherein said secondary fold lines delineate between separate energy sections;
wherein at least another portion of characters are associated with Lewis Dot structures; and
wherein said at least another portion of characters are removably attachable to said element fields.

4. The planar tactile periodic table of claim 3, wherein:
said element fields have different surface textures; and
said have different surface textures.

5. A planar tactile periodic table, consisting of:
a rigid substrate having a first side and a second side separated by a primary fold line;
an insert capable of being placed within said rigid substrate;
a plurality of element fields surrounded by field borders, affixed to said substrate and said insert and arranged in a grid pattern thereupon;
a plurality of characters associated with a standard periodic table, having at least a portion affixed to said rigid substrate and said insert;
wherein said field borders and said characters each are configured to provide a tactile feedback to a user, relative to said element fields;
wherein said rigid substrate further comprises a plurality of secondary fold lines;
wherein said planar tactile periodic table is adapted to provide a plurality of periodic table of elements features for a visually impaired user;
wherein said tactile feedback includes an item selected from the group consisting of an element symbol, an atomic number digit, or an atomic weight digit;
wherein said element fields and said characters depict a periodic table including Groups 1A through 8A elements;
wherein said secondary fold lines delineate between separate energy sections;
wherein at least another portion of characters are associated with Lewis Dot structures; and
wherein said at least another portion of said characters are removably attachable to said element fields.

6. The planar tactile periodic table of claim 5, wherein:
said element fields have different surface textures; and
said characters have different surface textures.

7. A planar tactile periodic table, consisting of:
a rigid substrate having a first side and a second side separated by a primary fold line;
an insert capable of being placed within said rigid substrate;
a first rod having a first pair of hanging elements on distal ends thereof, affixed to an edge of said first side;
a second rod having a second pair of hanging elements on distal ends thereof, affixed to an edge of said second side opposite said first side;
a plurality of element fields surrounded by field borders, affixed to said substrate and said insert and arranged in a grid pattern thereupon; and
a plurality of characters associated with a standard periodic table, having at least a portion affixed to said rigid substrate and said insert;
wherein said field borders and said characters each are configured to provide a tactile feedback to a user, relative to said element fields;
wherein said first pair of hanging elements and said second pair of hanging elements are capable of suspending said planar tactile periodic table from a support structure;
wherein said rigid substrate further comprises a plurality of secondary fold lines;
wherein said planar tactile periodic table is adapted to provide a plurality of periodic table of elements features for a visually impaired user;
wherein said tactile feedback includes an item selected from the group consisting of an element symbol, an atomic number digit, or an atomic weight digit;
wherein said element fields and said characters depict a periodic table including Groups 1A through 8A elements;
wherein said secondary fold lines delineate between separate energy sections;
wherein at least another portion of characters are associated with Lewis Dot structures; and wherein said at least another portion of characters are removably attachable to said element fields.

8. The planar tactile periodic table of claim 7, wherein:
said element fields have different surface textures; and
said characters have different surface textures.

* * * * *